United States Patent [19]
Baxter et al.

[11] 4,300,640
[45] Nov. 17, 1981

[54] AGRICULTURAL IMPLEMENT HAVING FIELD AND TRANSPORT MODES

[75] Inventors: Bobby G. Baxter, Warrenton; Jerry L. Wilbeck, Kansas City; Wendell J. Wilbeck, St. Peters, all of Mo.

[73] Assignee: The Binkley Company, Warrenton, Mo.

[21] Appl. No.: 59,444

[22] Filed: Jul. 20, 1979

[51] Int. Cl.³ .............................................. A01B 73/00
[52] U.S. Cl. ................................. 172/311; 172/328; 172/413
[58] Field of Search ............... 172/310, 311, 328, 396, 172/413, 414, 417, 427, 456, 466, 568, 581, 584, 586, 587, 595, 596; 280/411 R, 411 A, 411 B, 411 C, 656; 56/228, 385

[56] References Cited

U.S. PATENT DOCUMENTS

| | | | |
|---|---|---|---|
| 2,704,018 | 3/1955 | Oehler et al. | 172/595 X |
| 2,952,472 | 9/1960 | McNeill | 172/466 X |
| 2,979,140 | 4/1961 | McKenzie | 172/413 X |
| 3,493,248 | 2/1970 | Tasset | 280/411 A |
| 3,708,018 | 1/1973 | Wilbeck | 172/313 |
| 3,727,697 | 4/1973 | Wilbeck | 172/313 |
| 3,912,018 | 10/1975 | Brundage et al. | 172/328 |
| 3,960,221 | 6/1976 | Blair et al. | 172/311 |
| 4,002,334 | 1/1977 | Wilbeck | 172/581 |
| 4,034,623 | 7/1977 | Boone et al. | 172/311 X |
| 4,066,274 | 1/1978 | Adee | 280/411 A |
| 4,126,187 | 11/1978 | Schreiner et al. | 172/311 |

*Primary Examiner*—Richard T. Stouffer
*Attorney, Agent, or Firm*—Senniger, Powers, Leavitt and Roedel

[57] ABSTRACT

A tandem offset disc implement comprising a frame on wheels, a tongue pivoted at the forward end of the frame for hitching the disc to a tractor, the frame being movable up and down, forward and rearward gangs of discs on opposite sides of the frame swingable between a field position extending out from the sides of the frame and a transport position extending rearward and also swingable up and down relative to the frame, swivel wheels for the gangs, and linkages between the tongue and the gangs for maintaining the gangs in field position for tilling.

20 Claims, 22 Drawing Figures

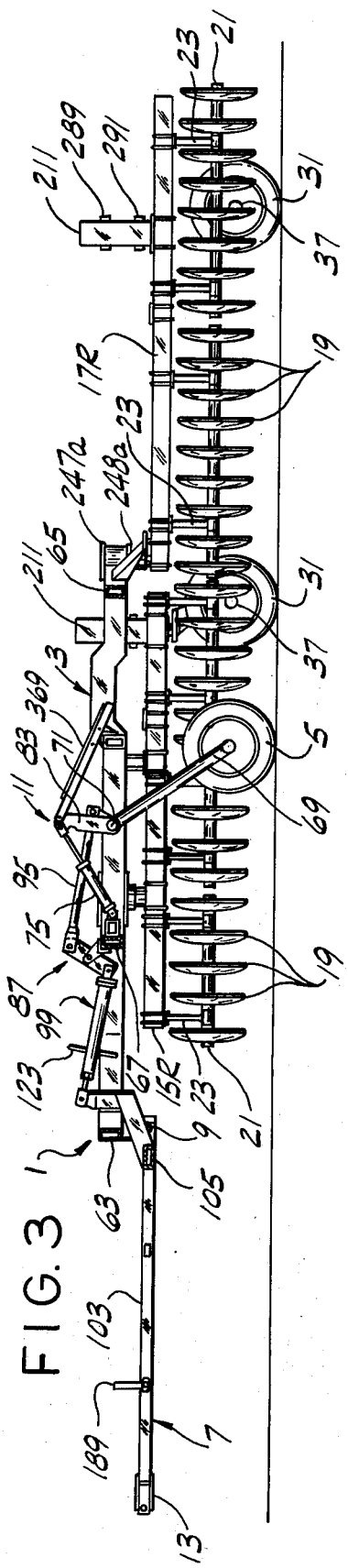

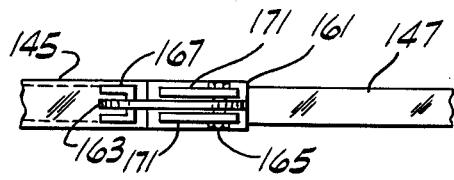
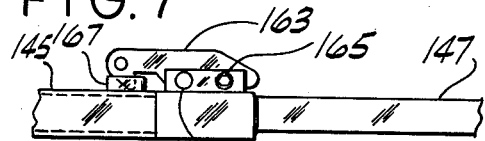
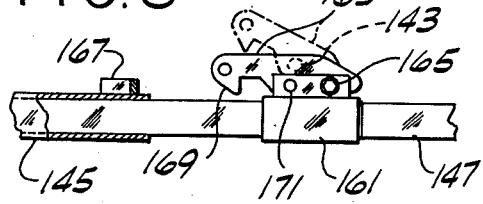
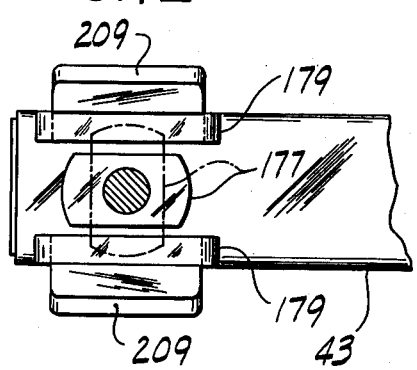
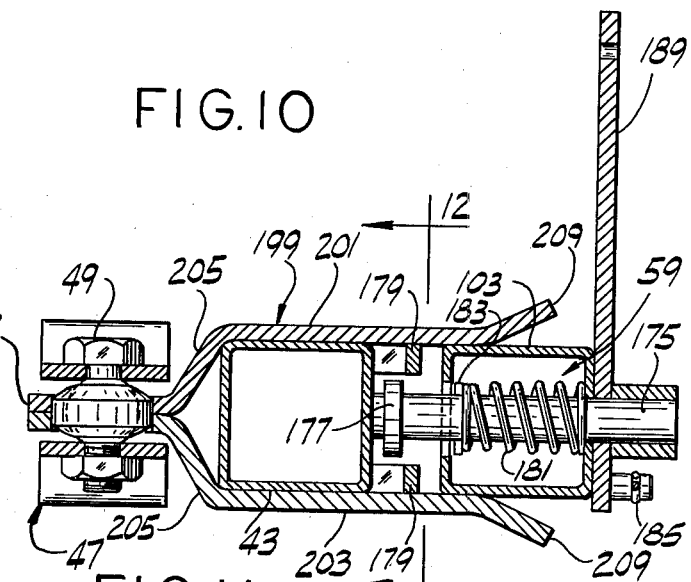
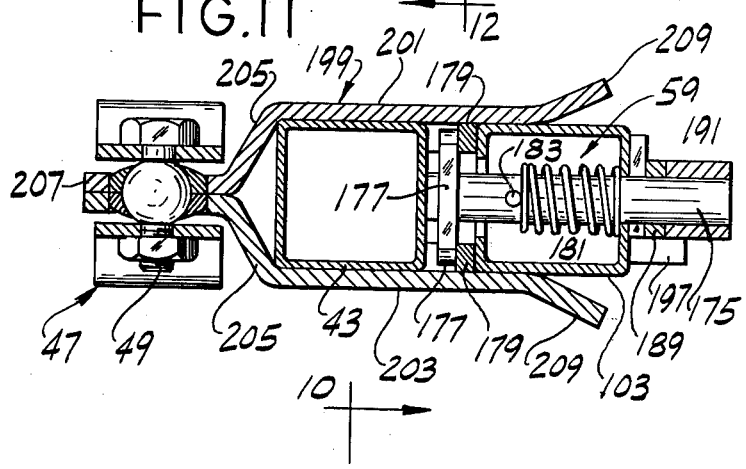
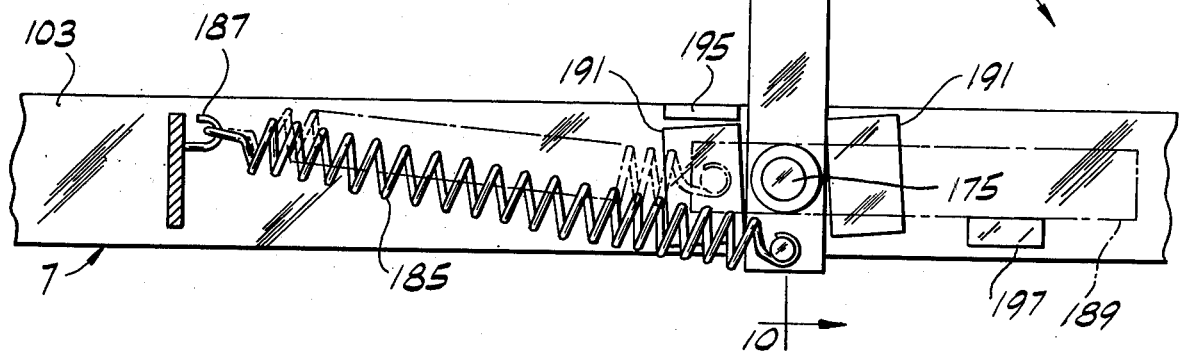

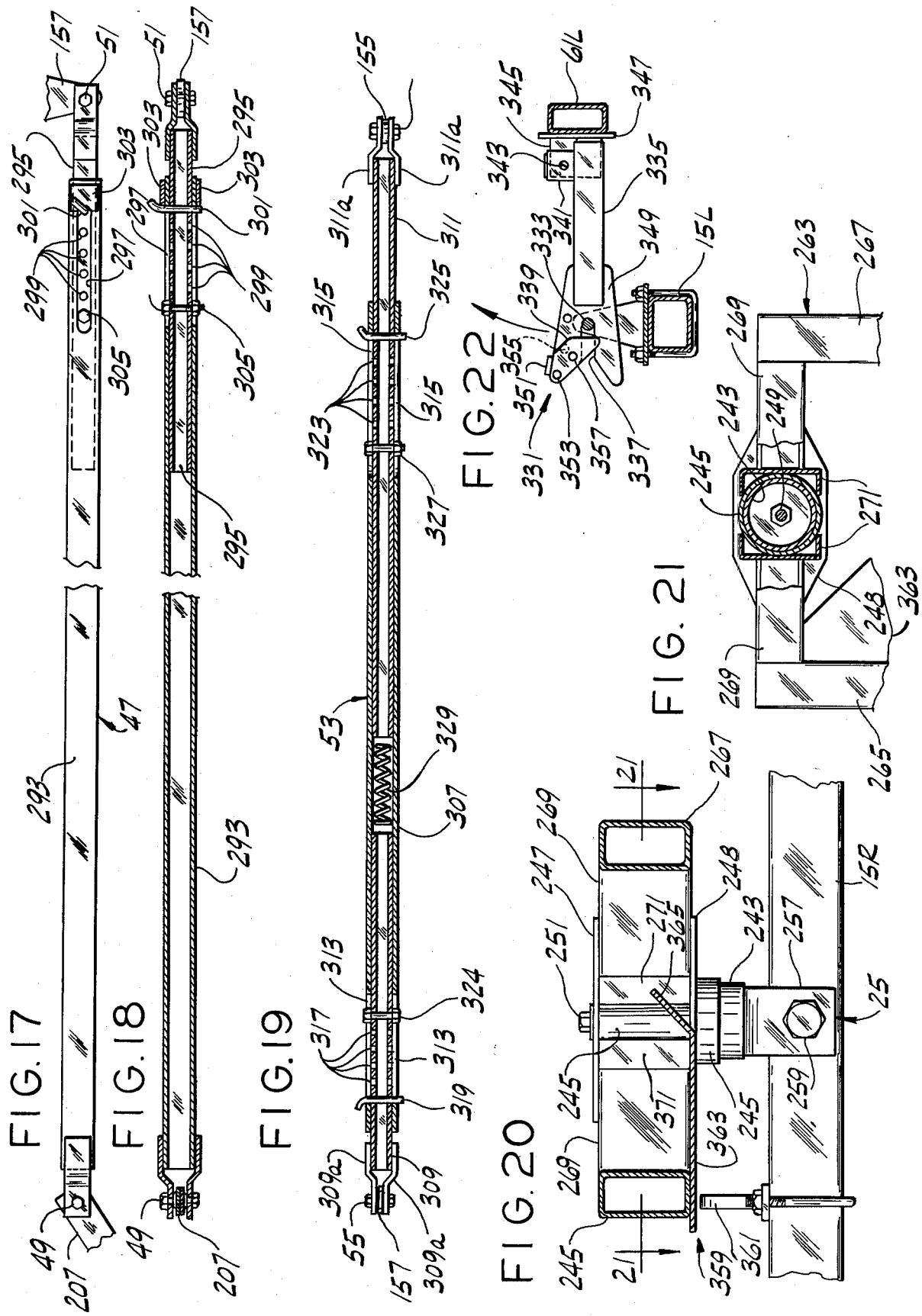

AGRICULTURAL IMPLEMENT HAVING FIELD AND TRANSPORT MODES

BACKGROUND OF THE INVENTION

This invention relates to agricultural implements, and more particularly to a disc harrow implement adapted to be pulled by a tractor, the implement being convertible from a mode for tilling the soil, referred to as the "field" mode, to a mode for being pulled over the road or through gates or over bridges, etc., referred to as the "transport" mode.

The invention is especially concerned with a disc harrow of the type referred to as a "tandem" disc, "tandem" meaning that it has leading and trailing gangs of discs, and more particularly a pair of forward gangs and a pair of rearward gangs, and even more especially concerned with a disc harrow of the type referred to as a "tandem offset disc", "offset" referring to the gangs being offset.

The tandem disc implement of this invention is one that is convertible from the field mode to the transport mode by the pivoting or folding of the gangs back to a trailing position, being in the same general class as the folding tandem disc shown in U.S. Pat. No. 4,066,274.

SUMMARY OF THE INVENTION

Among the several objects of this invention may be noted the provision of an improved agricultural implement of the type adapted to be pulled by a towing vehicle (e.g., a tractor or a truck), having forward and rearward tool-carrying beams (e.g., beams which carry gangs of discs or other tools for tilling the soil), with the beams foldable from a field position extending outwardly at opposite sides of the implement for tilling the soil to a trailing transport position extending generally parallel to the longitudinal axis of the implement for towing the implement over the road for transporting the implement from place-to-place, or for towing it through gates or over bridges, etc.; the provision of such an implement which enables the driver of the towing vehicle to effect movement of the beams from field to transport position without having to stop the towing vehicle, get off, and perform conversion operations off the towing vehicle; the provision of such an implement which enables the beams to move up and down, while remaining generally level, for depth-of-cut adjustment of the tillage tools (e.g., discs) and for being raised for transport; the provision of such an implement adjustable for a different cutting depth of the tools carried by the forward beams from the cutting depth of the tools carried by the rearward beams; the provision of such an implement having independent gang action, i.e., the capability of having the beams swing up and down relative to the frame independently of one another, thereby enabling the gangs to ride over obstructions in the field and minimize breakage of tools and racking stresses on the implement; the provision of such an implement wherein each beam is supported on a swivel wheel, and wherein the elevation of the beam relative to the swivel wheel is readily adjustable; and the provision of such an implement in which the beam swivel wheels are so positioned when the beams are in transport position as to minimize wear of tires on the swivel wheels on road travel of the implement.

In general, an implement of this invention comprises a frame on wheels, the frame having a longitudinal axis and left and right sides as viewed in a forward direction. A tongue for hitching the frame to a towing vehicle extends forward from the frame, being pivotally connected adjacent its rearward end to the frame for up and down swinging movement relative to the frame on an axis transverse to the frame. Means is provided for raising and lowering the frame relative to its wheels. The implement has a forward and a rearward tool-carrying beam on the left side of the frame, and a forward and a rearward tool-carrying beam on the right side of the frame, each beam carrying a gang of tools (e.g., discs). Each beam is pivoted on the frame on a first axis for swinging movement relative to the frame between a field position extending out from the respective side of the frame at an angle to the longitudinal axis of the frame and a transport position extending rearward from its pivot and generally parallel to the longitudinal axis of the frame, each beam also being pivoted on the frame for up and down swinging movement relative to the frame on a second axis. Each beam has a swivel wheel and means is provided for raising and lowering each beam relative to its swivel wheel whereby the beam may be maintained in a generally horizontal position as the frame is raised or lowered relative to its wheel. A linkage interconnects the tongue and the left forward and rearward beams, and a linkage interconnects the tongue and the right forward and rearward beams. Each linkage comprises an arm pivoted on the tongue for swinging movement between a field position extending forward from the pivot for the arm and a transport position extending out from the respective side of the tongue.

Each of said arms is swingable up and down with the tongue on swinging of the tongue on said transverse axis and swingable in and out relative to the tongue between the said field and transport positions of the arm. Each linkage further comprises a first link having a connection at one end constituting its forward end to the respective arm and a connection at its other end constituting its rearward end to the respective forward beam. These connections are such as to allow up and down swinging of the tongue relative to the frame and the forward beam and to allow swinging movement of the forward beam between its field and transport positions and up and down swinging of the forward beam relative to the frame. Each linkage further comprises a second link having a connection at one end constituting its forward end to the respective forward beam and a connection at its other end constituting its rearward end to the respective rearward beam. These connections are such as to allow swinging movement of the beams between their field and transport positions and relative up and down swinging of each beam frame and the respective second link. Means is provided for latching each of the arms in field position, the links thereupon holding the beams in field position as the implement is towed forward.

Other objects and features will be in part apparent and in part pointed out hereinafter.

BRIEF DESCRIPTION OF THE DRAWINGS

FIG. 3 is a vertical longitudinal central section of the implement on line 3—3 of FIG. 2, showing a frame of the implement raised to its maximum height;

FIG. 4 is an enlarged vertical longitudinal section generally on line 4—4 of FIG. 2;

FIG. 5 is a view of an adjustable-length link shown in FIG. 4, parts being broken away and shown in section;

FIG. 6 is an enlarged fragment of FIG. 2 showing latch means for a locking link of the implement;

FIG. 7 is a view in elevation of the parts shown in FIG. 6;

FIG. 8 is a view showing a moved position of the parts shown in FIG. 7.

FIG. 9 is an enlarged section on line 9—9 of FIG. 2, showing in solid lines a lever of a latching means in an upright release position and in phantom in a generally horizontal locking position;

FIG. 10 is a vertical section generally on line 10—10 of FIG. 9 showing the lever about to be moved out to a position for being swung to its locking position;

FIG. 11 is a view similar to FIG. 10 showing the lever moved out and swung to its locking position;

FIG. 12 is a vertical section on line 12—12 of FIG. 10, showing a latch bolt member in release position in solid lines and turned to locking position in phantom;

FIG. 17 is a plan of one of two forward links shown in FIGS. 1 and 2, on a larger scale than in FIGS. 1 and 2, broken away to reduce the length of the view;

FIG. 18 is a vertical longitudinal section of FIG. 17;

FIG. 19 is a vertical longitudinal section of one of two rearward links shown in FIGS. 1 and 2, on a larger scale than in FIGS. 1 and 2;

FIG. 20 is an enlarged vertical section on line 20—20 of FIG. 2;

FIG. 21 is a horizontal section on line 21—21 of FIG. 20; and

FIG. 22 is an enlarged vertical section on line 22—22 of FIG. 2.

Corresponding reference characters indicate corresponding parts throughout the several views of the drawings.

DESCRIPTION OF THE PREFERRED EMBODIMENT

Figure 1:
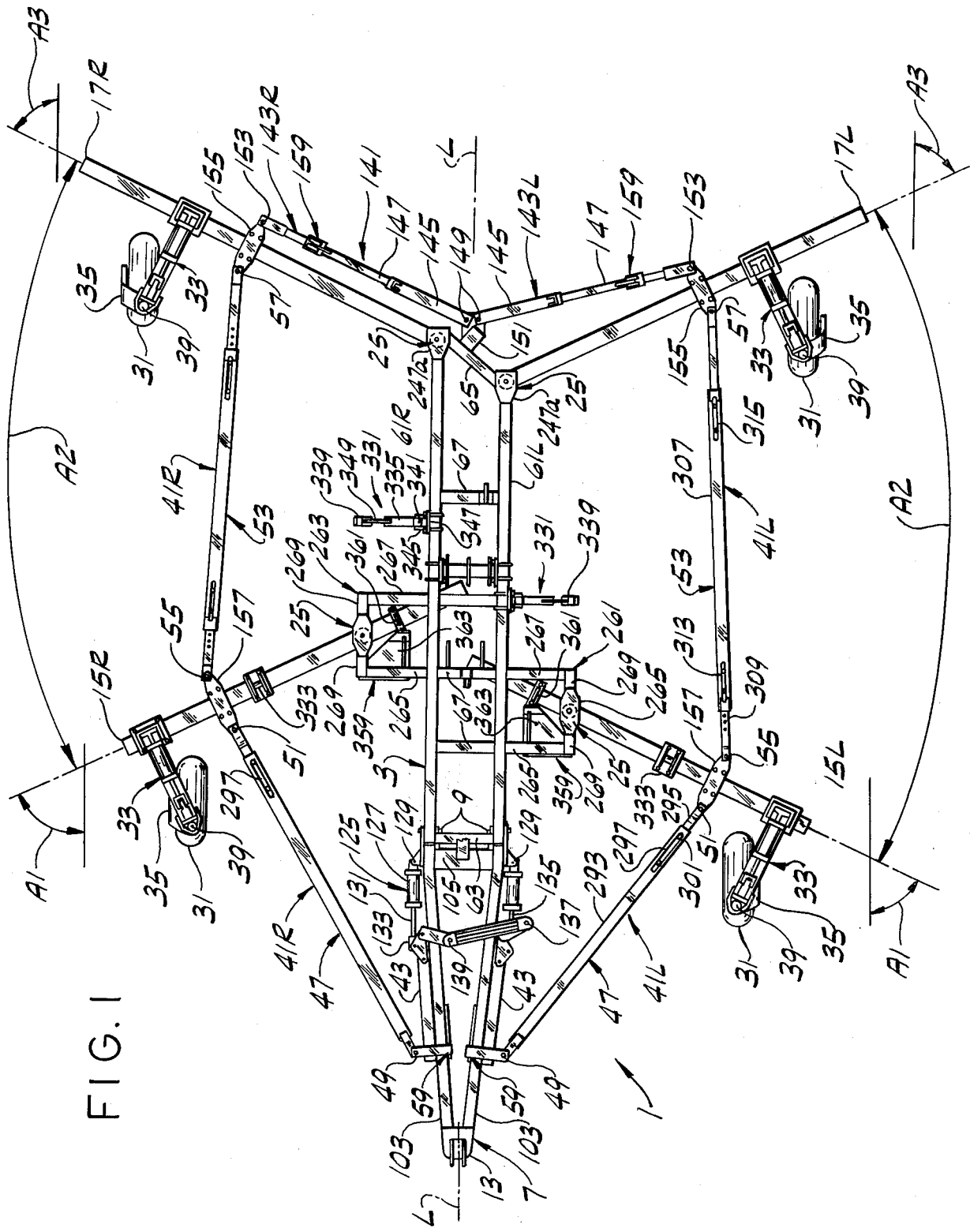
FIG. 1 is a plan view of a tandem offset disc implement of this invention, showing forward and rearward disc-carrying beams of the implement in a field position, parts being omitted.

Referring to the drawings, a tandem offset disc implement of this invention, indicated in its entirety at 1, is shown generally to comprise a frame 3 on wheels 5. The frame has a longitudinal axis indicated at L in FIGS. 1 and 2, and left and right sides as viewed in forward direction (which is toward the left as viewed in FIGS. 1-3). A tongue 7 for hitching the frame to a towing vehicle, e.g., a tractor (not shown), extends forward from the forward end of the frame, being pivotally connected at 9 adjacent its rearward end to the frame for up and down swinging movement relative to the frame on an axis transverse to the frame. Means indicated generally at 11 in FIGS. 2, 3 and 4 (omitted from FIG. 1) is provided for raising and lowering the frame 3 relative to the wheels 5. The tongue has means such as indicated at 13 at its forward end for coupling it to the towing vehicle, the coupling being a suitable conventional universal joint type as will be readily understood.

A forward tool-carrying beam and a rearward tool-carrying beam are provided on each side of the frame, the forward beams being designated 15L and 15R (left and right) and the rearward beams being designated 17L and 17R (left and right). Each beam carries a gang of tools, e.g., tillage tools, in this instance discs 19 mounted on shafts 21 extending parallel to the beam below the beam. The shafts are carried by hangers 23 extending down from the beam.

Each of the beams 15L, 15R, 17L, 17R is pivoted on the frame by means of a pivot generally designated 25 for swinging movement relative to the frame between a field position (see FIG. 1) extending out from the respective side of the frame at an angle to the longitudinal axis L of the frame and a transport position (see FIG. 2) extending rearward from the pivot and generally parallel to the longitudinal axis of the frame, and for up and down swinging movement relative to the frame on a second axis. The pivots 25 for all four of the beams are identical, each being in effect a universal joint. One of them is detailed in FIG. 16, where the stated first axis around which the respective beam is swingable between the field and transport positions is indicated at 27 and the stated second axis about which the beam is swingable up and down is indicated at 29. As appears in FIG. 2, the forward beams 15L and 15R extend on the outside of the vertical planes of the rearward beams 17L and 17R when the beams are in the transport position.

A swivel wheel 31 is provided for each of the four beams, and means indicated generally at 33 is provided for raising and lowering each beam relative to its swivel wheel, whereby the beam may be maintained in a generally horizontal position as the frame 3 is raised or lowered relative to its wheels 5. The swivel wheel for each beam is rotatably mounted on a swivel wheel carrier 35 for rotation about the wheel axis at 37, and the wheel carrier 35 is mounted for swivelling about a generally vertical axis indicated at 39, with the beam being movable up and down relative to the swivel wheel 31.

A linkage indicated generally at 41L is provided between the tongue 7 and the left forward and rearward beams 15L and 17L and a linkage indicated generally at 41R is provided between the tongue and the right forward and rearward beams 15R and 17R. Each of the left and right-hand linkages 41L and 41R comprises an arm 43 pivoted at 45 on the tongue 7 for swinging movement between a field position (see FIG. 1) extending forward from the pivot 45 on the outside of the respective side of the tongue, and a transport position (see FIG. 2) extending out from the respective side of the tongue and angled rearward, a first or forward link 47 pivotally connected as indicated at 49 at one end constituting its forward end to the respective arm 43 and pivotally connected as indicated at 51 at its rearward end to the respective forward beam (15L, 15R), and a second or rearward link 53 interconnecting each forward and rearward beam (15L and 17L, 15R and 17R). Each second or rearward link 53 is pivotally connected as indicated at 55 at its forward end to the respective forward beam (15L, 15R) and is pivotally connected as indicated at 57 at its rearward end to the respective rearward beam (17L, 17R). The pivotal connections at 49, 51, 55 and 57 are such as to enable the swinging of the tongue 7 relative to the frame 3 and the up and down swinging of the beams. Thus, each of these connections may be a universal joint type of connection and more particularly a ball joint pivotal connection as shown for the connection 49 in FIGS. 10 and 11.

The ball joint pivotal connections 49 between links 47 and arms 43 at the forward ends of links 47 and the free ends of arms 43 allow for pivoting of the arms and links 47 relative to one another about axes generally in the planes of the arms and links 47 and in planes generally perpendicular thereto. The ball joint pivotal connections 51 between links 47 and the forward beams 15L, R at the rearward ends of links 47 and toward the outer ends of the forward beams allow for pivoting of links 47 and the forward beams relative to one another about axes generally in the planes of links 47 and the forward beams and in planes generally perpendicular thereto. The ball joint pivotal connections 55 between links 53 and the forward beams at the forward ends of links 53 and toward the outer ends of the forward beams allow for pivoting of links 53 and the forward beams relative to one another about axes generally in the planes of links 53 and the forward beams and in planes generally perpendicular thereto. The ball joint pivotal connections 57 between links 53 and the rearward beams at the rearward ends of links 53 allow for pivoting of links 53 and the rearward beams relative to one another about axes generally in the planes of links 53 and the rearward beams and in planes generally perpendicular thereto.

Means indicated generally at 59 is provided for latching each of the arms 43 in the field position shown in FIG. 1 extending forward from its pivot 45 on the tongue 7. With the arms so latched, the links 47 ans 53 hold the beams 15L, 15R, 17L, 17R in field position. The latching means 59 is operable automatically to latch the arms 43 in the field position with a positive locking action when the arms swing forward to their field position, and is adapted to be released by remote control from the towing vehicle for allowing the arms to swing back to their transport position (see FIG. 2) as will appear.

The frame 3 is an elongate frame comprising left and right side members 61L and 61R, forward and rearward end members 63 and 65 and cross-braces such as indicated at 67 extending between the side members. The right-hand side member 61R is longer than the lefthand side member 61L and extends rearward beyond the left-hand side member, the rearward end member 65 thereby being angled relative to the side members as appears in FIGS. 1 and 2. There are two wheels 5 for the frame, these wheels being journalled for rotation on a horizontal axis extending transversely with respect to the frame at the lower end of a wheel carrier 69 constituting an element of means 11 for raising and lowering the frame 3 relative to the wheels 5, the wheel carrier being pivoted at its upper end for swinging movement on a horizontal axis extending transversely of the frame. The pivot here is provided by means of hub 71 on the upper end of the carrier 69 rotatable on a shaft 73 extending between the sides 61L and 61R of the frame 3. The wheel carrier is adapted to be swung one way or the other on the axis of the hub and shaft for raising and lowering the shaft and hence frame 3 relative to the wheels 5. For swinging the wheel carrier, means 11 comprises hydraulic cylinder and piston means, more particularly a pair of cylinders 75 pinned at 77 at their head ends on the inside of the side members of the frame 3, piston rods 79 extending from the rod ends of the cylinders to pin connections at 81 with rocker arms 83 extending radially from the wheel carrier hub 71. The arrangement is such that on retraction of the piston rods 79, the wheel carrier swings counterclockwise relative to the frame 3 as viewed in FIGS. 3 and 4 for lowering the frame, and vice versa. The height of the shaft 73 above the ground and the attitude (angle) of the frame 3 about the axis of the shaft with respect to the ground determines the cutting depth of the discs 19. On level ground, with the frame 3 horizontal, the cutting depth of the discs 19 on the forward beams 15L and 15R and the discs 19 on the rearward beams 17L and 17R is the same, assuming that the beams have been adjusted to be level for the particular elevation of the frame. A suitable adjustable cutting depth stop 85 (see FIG. 4) may be used in conjunction with one of the hydraulic cylinders 75 to control a valve V for the cylinders 75 to cut off their operation when, after having actuated the cylinders fully to extend the piston rods 79 and raise shaft 73 and frame 3 to the maximum height (FIGS. 3 and 4), the cylinders are reverse-actuated to retract the piston rods and lower shaft 73 and frame 3 to the elevation for the desired cutting depth of the discs. The frame 3 being swingable on shaft 73 relative to the wheel carrier 69 about the axis of the shaft, leveling means indicated generally at 87 is provided interconnecting the wheel carrier 69 and the tongue 7 for maintaining the frame in an adjusted attitude relative to the ground at its particular elevation, i.e., the frame, once it has been brought down from the maximum height to the elevation for the desired cutting depth of the discs, is adjusted angularly about the axis of shaft 73 by the leveling means relative to the ground to be level or inclined somewhat forward, for example, to set a greater cutting depth for the discs 19 on the forward beams 15L and 15R than for the discs on the rearward beams 17L and 17R, as may be desired when tilling uncut hard ground. Generally, the frame will be adjusted by the leveling means to have a level attitude (i.e., to be parallel to the ground).

The leveling means 87 is constituted by a linkage comprising a lever 89 pivoted at 91 on a bracket 93 on a crossbar 67 of the frame, a link 95 interconnecting the upper end of the lever and an arm 97 on the hub 71, and an adjustable-length link 99 interconnecting the lower end of the lever and an arm 101 extending upwardly from the rearward end of the tongue 7. The latter is in the form of an open triangular frame, comprising left and right side members each designated 103 extending forward from a rearward end member 105 and converging to an apex at the forward end of the tongue where the tongue carries the means 13 for coupling it to the towing vehicle. A parking jack (not shown) may be provided adjacent the forward end of the tongue. The side members 61L and 61R of the frame 3 have downwardly extending legs 107 (see FIG. 4) at their forward ends, and the rearward ends of the tongue side members 103 are pinned to these legs at 9. The arm 101 extends rearwardly and then upwardly between the side members of the frame 3 from the tongue rear end member 105. The adjustable-length link 99 (see FIGS. 4 and 5) comprises a rotary tubular member 109 extending between non-rotary rear and forward end members 111 and 113, with 111 pinned at 115 to the lower end of lever 89 and 113 pinned at 117 to the upper end of the arm 101. The tubular member 99 has a rotary connection as indicated at 117 at its rearward end with member 111, and a nut 119 at its forward end in threaded engagement with a screw 121 of member 113. A handle 123 extends transversely through the tubular member for turning it one way or the other to adjust the length of the link 99, i.e., to adjust the distance between pins 115 and 117. The arrangement is such that with the tongue 7 coupled to the towing vehicle, on lengthening the link 99, with wheels 5 remaining in engagement with the ground, the frame 3 rocks clockwise on the axis of shaft 73, and on shortening the link 99, the frame 3 rocks counterclockwise on the axis of shaft 73.

Figure 2:
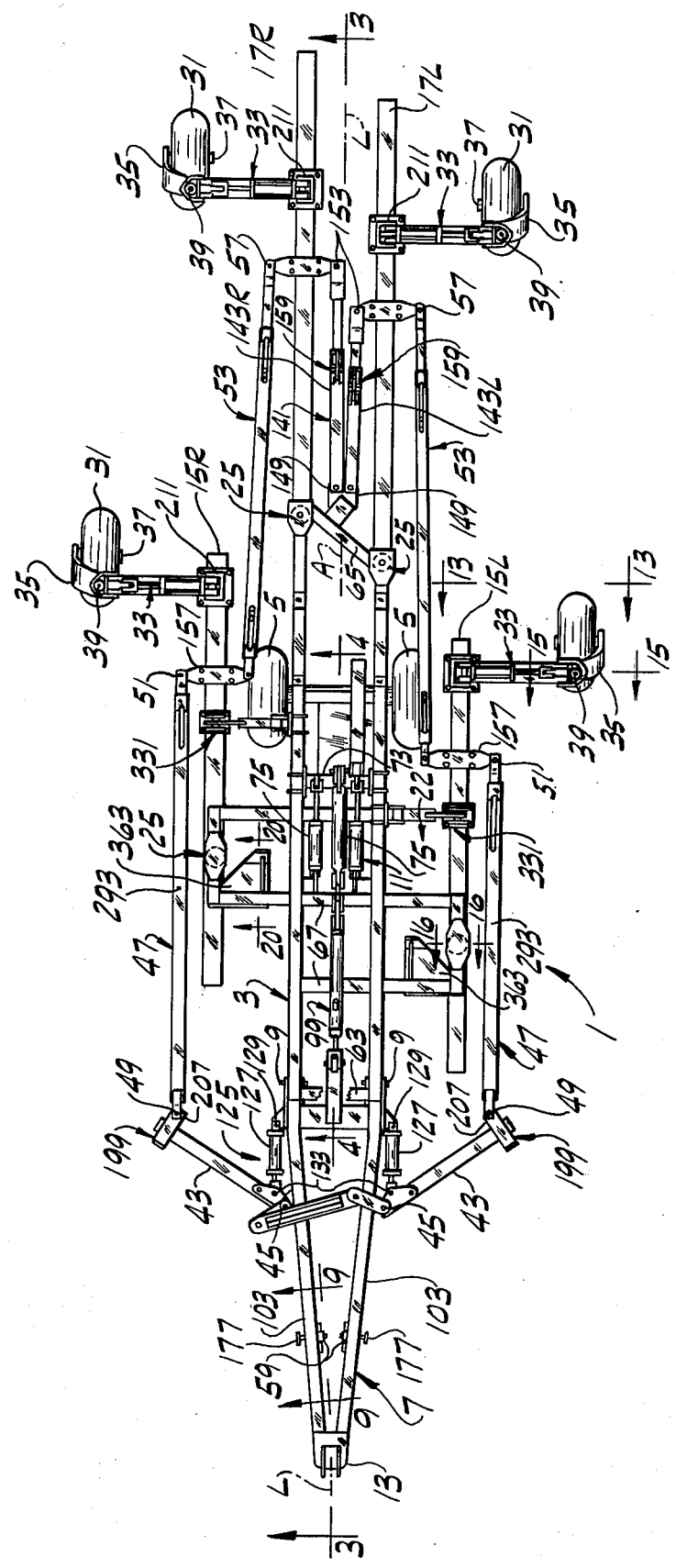
FIG. 2 is a plan view of the implement showing the beams in transport position.

Hydraulic-powered means indicated generally at 125 is provided for actuating the aforesaid linkages 41L, 41R. As shown in FIGS. 1 and 2, this comprises hydraulic cylinder and piston means interconnected between the tongue 7 and the arms 43, more particularly left-hand and right-hand cylinders each designated 127 and each having its head end pin-connected as indicated at 129 on the outside of the respective side member 103 of the tongue 7. The cylinders extend forward from the pivots 129 alongside the tongue. Their piston rods 131 extend forward out of their rod ends and are pin-connected as indicated at 133 at their forward ends to the arms 43. The arrangement is such that on extending the piston rods 131, the arms 43 are swung to their field position (FIG. 1) and on retracting the piston rods, the arms are swung to their transport position (FIG. 2). Means constituted by a link 135 pin-connected as indicated at 137 to the left-hand arm 43 and pin-connected as indicated at 139 to the right-hand arm 43 interconnects the arms 43 for their operation in unison.

Means indicated generally at 141 is provided at the rear of the frame 3 for automatically locking the rearward beams 17L, 17R in transport position when they swing rearward to transport position. This locking means comprises an extensible locking link 143L interconnected between the frame 3 and the left-hand rearward beam 17L, and an extensible locking link 143R interconnected between the frame and the right-hand rearward beam 17R. Each of these extensible locking links comprises a forward tubular section 145 and a rearward section 147 telescopically slidable in the forward section. The forward section 145 of each locking link is pin-connected as indicated at 149 at its forward end to a bracket 151 on the frame rear end member 65. The rearward sections 147 extend out of the rearward ends of the forward sections and are pin-connected as indicated at 153 at their rearward ends to brackets 155 on the rearward beams 17L, 17R. The connections at 149 and 153 are ball joint pivotal connections (like those at 49, 51, 55 and 57) permitting swinging of the locking links 143L and 143R between a field position (FIG. 1) extending out at an angle to the longitudinal axis L of the frame 3 and a locking transport position (FIG. 2) extending rearward from the frame, and also permitting the swinging of the rearward beams 17L, 17R between their field and transport positions and up and down. Connections 57 are made to the stated brackets 155. Connections 51 and 55 are made to similar brackets 157 on the forward beams 15L and R.

The locking links 143L and R are extended (i.e., their rearward sections 147 slide out relative to their forward sections 145) when the rearward beams 17L, 17R swing to field position (see FIG. 1) and are contracted (i.e., their rearward sections 147 slide in relative to their forward sections 145) when the rearward beams swing to transport position. Means indicated generally at 159 in FIGs. 1, 2 and 6-8 is provided on each locking link for maintaining it in a contracted transport condition thereby to lock the rearward beams 17L and R in transport position. This means 159 comprises first a collar 161 secured on the rearward section 147 engageable with the rearward end of the forward section 145 when the rearward section slides inward to limit the contraction of the locking link to the length establishing a position for the locking link extending rearward from its pivot generally parallel to the longitudinal axis L of the implement on the respective side of said axis and, second, a latch member 163 pivoted at 165 on the collar biased downwardly by its own weight for latching engagement with a U-shaped lug 167 on the forward section 145 adjacent its rearward end when the rearward section 147 slides inward to the point where collar 161 engages the rearward end of the forward section. The latch member has a camming edge 169 for camming it up over the lug 167 as the rearward section completes its retraction in the forward section. The latch is pivoted between flanges 171 on the collar, and a pin is adapted for insertion through holes at 171 in these flanges for holding the latch up, if desired, (as shown in phantom in FIG. 8), or through holes 171 and a hole 173 in the latch for holding the latch down in its locking position shown in solid lines in FIGS. 7 and 8.

Each of the frame side members 61L and R, each of the gang beams 15L and R, 17L and R, each of the arms 43 and each of the tongue side members 103 is preferably a tubular square cross section steel member. The latching means 59 for each of the arms 43 (see particularly FIGS. 9-12) comprises a plunger 175 slidable on its axis laterally inwardly and outwardly in the respective side member 103 of the tongue 7 and also rotatable on its axis in the tongue side member 103, this plunger having a latch bolt member 177 on its outer end rotatable with the plunger between a latching position (see FIG. 11 and the phantom position of 177 in FIG. 12) with respect to a notched bolt-receiving means 179 on the side of the arm 43 toward the respective side of the tongue, and a release position (see FIG. 10 and the solid line position of 177 in FIG. 12) with respect to means 179. Spring means is provided for biasing the plunger 175 to slide outwardly with respect to the side 103 of the tongue 7 to an extended position (FIG. 10) relative to the respective side of the tongue, and to rotate to turn the latch bolt member 177 from its release position (FIG. 10) to its latching position (FIG. 11), this spring means comprising a coil compression spring 181 surrounding the plunger 175 reacting from the inside wall of the respective side member 103 of the tongue 7 against a pin 183 in the plunger and a tension spring 185 interconnected between the side member 103 of the tongue at 187 and the lower end of a lever 189 secured to the plunger on the inside of the side member 103 of the tongue. The bolt member 177 and lever 189 are at such angles relative to one another on the plunger 175 (at right angles as shown) that with the lever extending generally vertically upward (FIGS. 9 and 10), the bolt member 177 extends generally horizontally (which is its release position) and with the lever extending generally horizontally (FIG. 11) the bolt member 177 extends generally vertically (which is its latching position as shown in phantom in FIG. 12). Means constituted by a pair of lugs 191 on the inside of the respective side member 103 of the tongue 7 is operable when the plunger 175 is in its axially outer position (FIG. 10) and the lever 189 is in its vertical release position (FIGS. 9 and 10) to hold the lever 189 in the latter position thereby to hold the plunger 175 with the bolt member 177 turned to its horizontal release position (FIGS. 10 and 12). The arm 43 is engageable with the outer end of the plunger 175 when the arm 43 swings in toward its field position (FIG. 1) to drive the plunger axially outwardly (from its FIG. 10 to its FIG. 11 position) to release the lever 189 and hence the plunger 175 from the holding lugs 191 thereby to allow spring 185 to rotate the plunger 175 clockwise as viewed in FIG. 9 and turn the latch bolt member 177 to its vertical latching position of FIG. 11 (its phantom position in FIG. 12) wherein it engages means 179 for tightly latching the arm 43 in field position. Means constituted by a cable 193 operable from the towing vehicle is connected to the lever 189 for actuating it to rotate the plunger 175 to turn bolt member 177 to the release position (FIGS. 10 and 12) for releasing the arm 43 for movement to transport position. When the lever is swung up against the bias of spring 185 by pulling on the cable 193, it engages a stop 195 on the inside of the respective side member 103 of the tongue 7 to determine its vertical release position, and is biased axially outward by spring 181 against the inside of the respective side member of the tongue, where it is caught between the lugs 191. When the plunger 175 moves axially inward, spring 185 swings the lever down to its release position, determined by engagement of the lever with a stop 197 on the inside of the respective side member 103 of the tongue, as shown in phantom in FIG. 9.

Each arm 43 has guide means 199 thereon adjacent its forward end engageable with the respective side member 103 of the tongue 7 as the arm swings to field position for guiding the arm to engage the outer end of the plunger 175 and properly to position the holding means 179 relative to the latch bolt member 177. This guide means is in the form of a fork adapted to straddle the respective side member 103 of the tongue, being constituted by a pair of straps 201 and 203 secured to the arm 43 adjacent its forward end, one (201) extending transversely with respect to the arm over the top of the arm and the other (203) extending transversely with respect to the arm on the bottom of the arm. These straps are bent toward one another on the outside of the arm 43 as indicated at 205 to provide an ear 207 on arm 43 where the ball joint connection 49 is made. They have flared inner end portions 209 for guidance alignment of the arm with the side member 103 of the tongue 7 as the arm 43 swings toward the side member 103.

Figure 13:
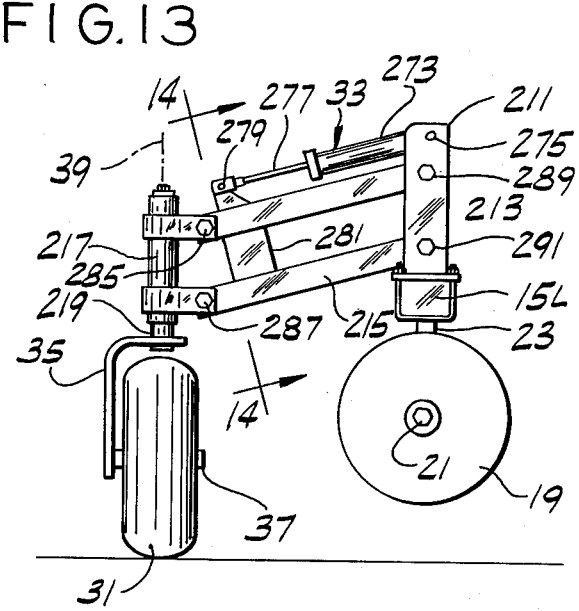
FIG. 13 is a view on line 13—13 of FIG. 2.
Figure 15:
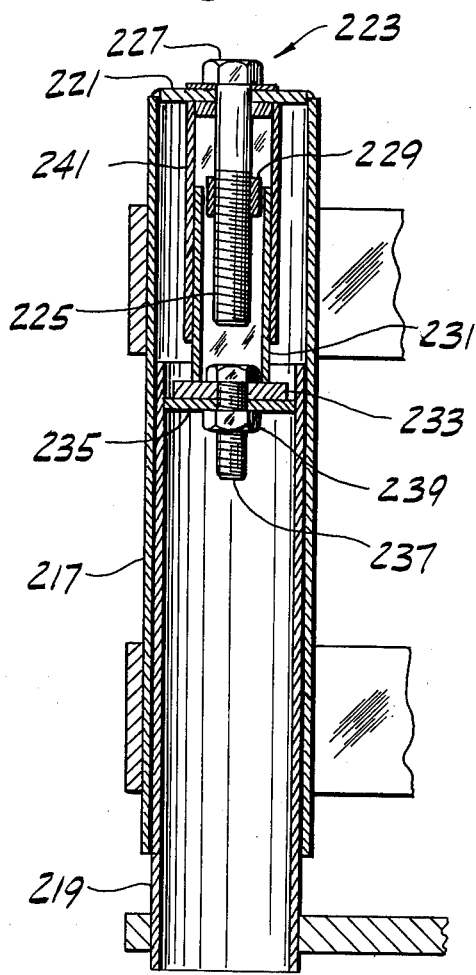
FIG. 15 is an enlarged section on line 15—15 of FIG. 2.

The means 33 for raising and lowering each beam 15L and R, 17L and R relative to its swivel wheel 31 comprises means in the form of a four-bar linkage supporting the beam on the respective wheel carrier 35, each supporting means or linkage 33 extending laterally outwardly from the respective beam, with the respective wheel carrier 35 mounted at the outer end thereof for swivelling about the aforesaid generally vertical axis at 39. The four-bar linkage (see FIG. 13) comprises a post 211 extending up from the respective beam, upper and lower links 213 and 215 extending out from the post, and a sleeve 217 at the outer end of these links. The wheel carrier 35 has a tubular spindle 219 (see FIGS. 13 and 15) extending upwardly therefrom rotatable in the sleeve, the latter having a cap 221 welded at its upper end. Means indicated generally at 223 accessible from the upper end of the sleeve 217 is provided for adjusting the sleeve up and down relative to the spindle for leveling the beam in the initial set-up of the implement, as may be required on accont of tolerances allowed in the manufacture of the implement. This means comprises an adjusting screw 225 rotatable in the cap 221. The screw has a head 227 at its upper end on top of the cap accessible for application of a wrench to turn the screw. The screw extends down in the sleeve 217 from the cap, being in threaded engagement with a nut 229 welded in the upper end of a tube 231 of non-round (e.g., square) cross-section. Tube 231 extends up from the upper end of the spindle 219, having a base 233 bearing on a disc 235 welded in the spindle 219 adjacent its upper end. Disc 235 is rotatable (for swivelling of the spindle 219 on its axis relative to the lower end of the tubular member 231). A bolt 237 extending through center holes in the base 233 and disc 235 has a nut 239 threaded up thereon for holding the parts centered while allowing rotation of the spindle 219 about its axis relative to the tube/base assembly 231 and 233. The tube 231 is slidable up and down in a tube 241 having a cross section (e.g., square) similar to but larger than the cross section of tube 231, this outer tube 241 preventing rotation of the inner tube 231 while allowing the latter to slide up and down. The arrangement is such that by turning the screw 225 one way or the other, the sleeve 217 may be raised or lowered relative to the spindle 219 and the swivel wheel carrier 35, thereby to raise or lower the respective beam 15L or R, 17L or R relative to the respective swivel wheel 31.

Figure 16:
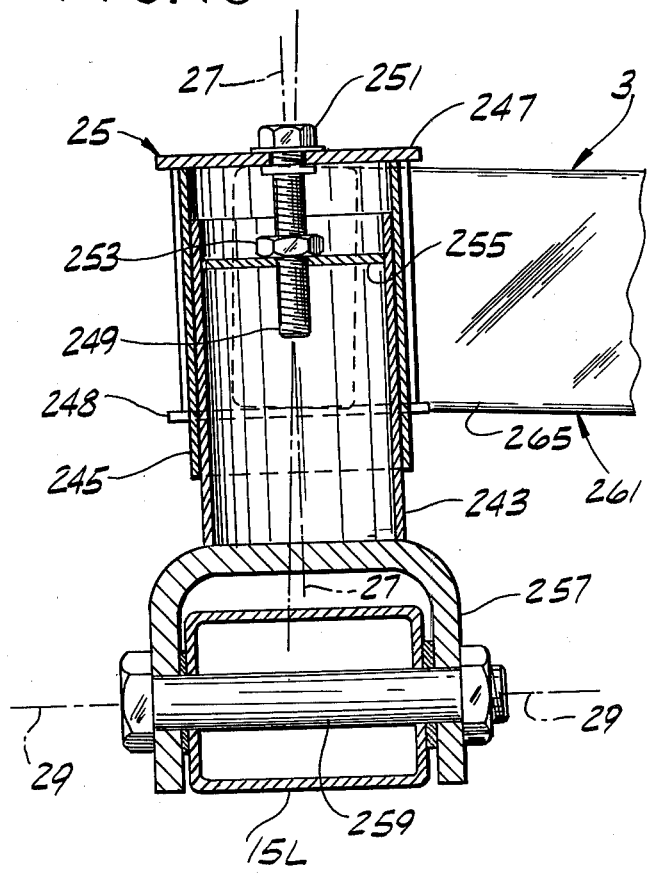
FIG. 16 is an enlarged section on line 16—16 of FIG. 2.

As noted above, each of the beams is pivoted on the frame 3 by means of a pivot 25 which allows not only for swinging movement of the beam between field and transport position on axis 27, but also for up and down swinging movement of the beam on axis 29. Referring more particularly to FIG. 16, pivot 25 for the beam 15L is shown to comprise a tubular spindle 243 (of relatively large diameter) rotatable and slidable up and down in a sleeve bearing 245 mounted on the frame 3. A cover plate for the sleeve bearing is indicated at 247. The bearing extends down through a hole in a brace plate 248, being open at its lower end. An adjusting screw 249 is rotatable in the cover plate on the axis 27 of the bearing. The screw has a head 251 at its upper end for application of a wrench to turn it. The screw extends down in the sleeve bearing from the cover plate, being threaded in a nut 253 welded on a disc 225 welded in the tubular spindle 243 adjacent the upper end of the spindle. The arrangement is such that by turning the screw 249 one way or the other, the spindle 243 may be adjusted up or down in the sleeve bearing 245. At the lower end of the spindle is a downwardly opening clevis 257. The beam 15L is pivoted on a pin 259 in the clevis for swinging on the axis 29. This axis is at right angles to the axis 27. The sleeve bearing 245 is mounted in the frame 3 with the axis 27 of the bearing and the spindle 243 in a vertical transverse plane of the frame 3, and slightly inclined off vertical (e.g., about 2½° off vertical) inwardly toward the longitudinal central plane of the frame from top to bottom (i.e., the bottom of the sleeve bearing is closer to the longitudinal central plane of the frame than the top of the sleeve bearing). Axis 29 (pin 259 in the clevis 257) is thereby inclined off horizontal (e.g., about 2½°). The pivots 25 for all four of the beams 15L and R, 17L and R are all the same; the axis 27 of each of the pivots for the four beams is inclined inward from top to bottom. The reason for this inclination is to avoid a reverse camber of the swivel wheels when the beams swing to the transport position to minimize wear of tires on the swivel wheels on road travel of the implement. Such reverse camber might otherwise occur due to the high weight of the beam and discs carried by the beam tending to tilt the swivel wheel carrier 35.

The sleeve bearing 245 of the pivot 25 for the left-hand forward beam 15L is mounted at the outer end of a lateral extension 261 of the frame 3 which extends out to the left of the frame, and the sleeve bearing 245 of the pivot 25 for the right-hand forward beam 15R is mounted at the outer end of a lateral extension 263 of the frame. Each of these lateral extensions 261 and 263 comprises a forward member 265 and a rearward member 267 extending laterally outwardly from the respective side member (61L, 61R) of the frame 3, and a pair of outer end members each designated 269 extending toward one another from the outer ends of members 265 and 267. As shown in FIG. 21, the sleeve bearing 245 is welded in position between channel-section pieces 271 at the opposed ends of the end members 269. The cover plate 247 for the sleeve bearing extends over and brace plate 248 extends under the end members 269. The left side lateral extension 261 is offset forward of the right side extension 263. The pivots 25 for the beams 15L and 15R are at the center of the outer ends of these extensions; thus the pivot 25 for beam 15L is offset forward of the pivot 25 for beam 15R. Each of the beams 15L and 15R is pivoted in the clevis 257 of its respective pivot 25 intermediate the ends of the beam with the arrangement such that when these beams are in field position (one example of which is shown in FIG. 1) the inner ends of the beams are generally at the vertical central longitudinal plane of the frame.

The sleeve bearing 245 of the pivot 25 for the left-hand rearward beam 17L is mounted at the rear end of the left side member 61L of the frame 3 and the sleeve bearing 245 of the pivot 25 for the right-hand rearward beam 17R is mounted at the rear end of the right side member 61R of the frame. In each instance here, the cover plate for the sleeve bearing is designated 247a and the brace plate is designated 248a. These plates extend over and under and are welded to the frame side members 61L and R. Each of the rearward beams 17L and R is pivoted in the clevis 257 of its respective pivot 25 at the inner end of the beam. The pivot 25 for the left-hand rearward beam 17L is offset forward of the pivot 25 for the right-hand rearward beam 17L. With the pivots 25 for the rearward beams at the rearward ends of the side members 61L and R of the frame 3, and with the pivots 25 for the forward beams 15L and R spaced outwardly from the side members 61L and R of the frame, the forward beams 15L and R extend on the outside of the vertical planes of the rearward beams 17L and R when the beams are in the transport position as appears in FIG. 2.

Figure 14:
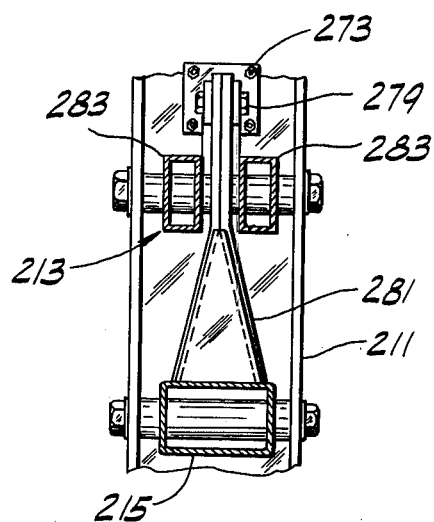
FIG. 14 is a section on line 14—14 of FIG. 13.

The means 33 for raising and lowering each beam relative to its swivel wheel 31 includes, in addition to the four-bar linkage constituted by 211, 213, 215 and 217, a hydraulic cylinder 273 pin-connected as indicated at 275 at its head end at the upper end of the post 211 and having its piston rod 277 extending from its rod end to a pin connection at 279 with the upper end of a lug 281 on the lower link 215 of the four-bar linkage. The upper link 213 of this linkage comprises two parallel bars 283 and the lug extends up between these bars (see FIG. 14). Links 213 and 215 are pin-connected at 285 and 287 to the sleeve 217 and at 289 and 291 to the post 211. The arrangement is such that on retracting the piston rod 277, links 213 and 215 of the four-bar linkage swing down on pins 285 and 287 (clockwise as viewed in FIG. 13 on the axes of these pins) to lower the beam at the swivel wheel, and vice versa, the post remaining generally vertical.

Each of the links 47 is an adjustable-length link for adjustment of the field angles of the forward beams 15L and R and the rearward beams 17L and R to the vertical longitudinal central plane of the implement when the beams are in field position, and the angle between the forward and rearward beam on each side. These angles, which may be referred to as the "gange angles", are indicated in FIG. 1 at A1 (forward gang angle), A2 (the angle between the forward and rearward gangs and A3 (the rearward gang angle). Each of the links 47 comprises an outer tube 293 and an inner tube 295 slidable in the outer tube and extending out of the rearward end of the outer tube (see FIGS. 17 and 18). Each outer tube 293 is pivotally connected at its forward end at 49 to the ear 207 on the respective arm 43. As herein illustrated, the tubes 293 and 295 are of square cross section. The outer tube 293 has a slot 297 extending lengthwise thereof adjacent its rearward end in its vertical central longitudinal plane, this slot being cut in the top and bottom walls of the outer tube. The inner tube 295 has a series of holes 299 spaced at intervals lengthwise thereof in line with the slot, these holes being drilled through the top and bottom walls of the inner tube. The inner tube extends out of the rearward end of the outer tube and is pivotally connected at its rearward end at 51 to the bracket 157 on the respective beam (15L, 15R). A pin 301 inserted in one of the holes 299 in the inner tube 295 through the slot 297 in the outer tube 293 is engageable with the rearward end of the slot when the inner tube is extended from the outer tube for determining the extended length in field position of the link 47, (the "extended length" being the distance between the connections 49 and 51). The outer tube 293 has reinforcement 303 at the rearward end of the slot 297 engageable by the pin 301. The pin 301 is removable from whatever hole 299 it may have been previously placed in and replaceable in another of the holes 299 to change the extended length of the link. A bolt 305 in the forwardmost hole of the series of holes 299 in the inner tube 295 prevents complete withdrawal of the inner tube 295 from the outer tube 293 if the user should forget to insert pin 301 in one of the holes 299. Slot 297 is of greater length than the distance between the rearwardmost hole in which pin 301 is placed (for minimum link length) and the forwardmost hole in which bolt 305 is placed to allow some measure of inward movement of the inner member 295 relative to the outer member 293 even when pin 301 is in said rearwardmost hole.

Each of the links 53 comprises two members adapted to be extended and contracted, these members being adapted to contract as the rearward beams 17L, 17R swing back toward their transport position, each link having spring means between its said two members tending to extend them when the rearward beams are in transport position. Thus, each of the links 53 comprises an outer tube 307 and, as the stated two members, a forward inner member 309 and a rearward inner member 311 each slidable in the outer tube. The outer tube has forward and rearward slots 313 and 315 adjacent its forward and rearward ends in its vertical central longitudinal plane, these slots being cut in its top and bottom walls. The forward inner member 309 extends forward out of the forward end of the outer tube 307 and has end straps 309a at its forward end pivotally connected at 55 to the bracket 157 on the respective forward beam (15L, 15R). The rearward inner member 311 extends rearward out of the rearward end of the outer tube and has end straps 311a at its rearward end pivotally connected at 57 to the bracket 155 on the respective rearward beam (17L, 17R). The forward inner member 309 has a series of holes 317 spaced at intervals lengthwise thereof in line with the forward slot 313. A forward pin 319 inserted in one of the holes 317 of the forward inner member 309 through the forward slot 313 is engageable with the forward end of the forward slot to determine the forward extension of the forward inner member from the forward end of the outer tube 307. The pin 319 is removable from whatever hole it may have been previously placed in and replaceable in another of the holes 317 to change the extension of the forward inner member. A bolt 321 in the rearwardmost hole of the series of holes 317 in the forward inner member 309 prevents complete withdrawal of the forward inner member from the outer tube if the user should forget to insert pin 319 in one of the holes 317. The rearward inner member 311 has a series of holes 323 spaced at intervals lengthwise thereof in line with the rearward slot 315. A rearward pin 325 inserted in one of the holes 323 of the rearward inner member 311 through the rearward slot 315 is engageable with the rearward end of the rearward slot to determine the rearward extension of the rearward inner member from the rearward end of the outer tube 307. The pin 325 is removable from whatever hole it may have been previously placed in and replaceable in another of the holes 323 to change the extension of the rearward inner member. A bolt 327 in the forwardmost hole of the series of holes 323 in the rearward inner member prevents complete withdrawal of the rearward inner member from the outer tube if the user should forget to insert pin 325 in one of the holes 323. The spring means between the two inner members 309 and 311 comprises a coil compression spring 329 in the outer tube 307 between the inner ends of the two inner members. The slots 313 and 315 are of such length as to allow inward movement of members 309 and 311 in the outer tube 307 far enough to compress the spring 329 even when pin 319 is in the forwardmost of holes 317 and pin 325 is in the rearwardmost of holes.

Means indicated generally at 331 is provided for locking each of the forward beams in transport position, this means permitting upward swinging of each forward beam about its pivot axis 29. As shown best in FIGS. 1, 2 and 22, each said locking means comprises a latch pin 333 on the respective forward beam (15L, 15R), and a latch arm 335 pivoted on the respective side member 61L or R of the frame 3 for swinging movement upwardly from a lowered retracted position. The latch arm has a notch 337 at its outer end for receiving the latch pin on the respective forward beam when the latter swings to transport position. A latch member 339 is provided on the latch arm for latching the latch pin in the notch. The latch arm has an upward extension 341 adjacent its rearward end, the latch arm being pivoted for swinging movement upwardly from the lowered retracted position in which it is shown in FIG. 22 by a pin 343 carried by a C-shaped bracket 345 mounted on the outside of the side frame member 61L or R, the pin extending through the extension 341 adjacent its upper end. The arm extends inward from the extension 341, the inner end of the arm being engageable with the base 347 of the bracket to determine the lowered retracted position of the arm (in which it extends horizontally outwardly from the side member (61L or R) of the frame 3. The arm has an outer end plate 349 in a vertical plane, the notch 337 being in this plate. The latch member 339 is a two-legged member having legs on opposite sides of the plate 349 and a bridge 351 connecting the legs at the top. It is pivoted at 353 on the plate 349, being gravity-biased to swing on the pivot 353 to the position shown in FIG. 22 determined by engaagement of the bridge 351 with the upper edge of plate 349 wherein its legs extend across the notch 337. The arrangement is such that, as the beam (15L or R) swings to transport position, pin 333 on the beam is adapted as it enters the notch to engage the outer edge of the latch member 339, swing the latter up, and move to the inner end of the notch, whereupon the latch member swings down by gravity to its latching position of FIG. 22 latching the pin 333 in the notch. The pin may be released from the notch by swinging the latch up counterclockwise as viewed in FIG. 22. Holes such as indicated at 355 and 357 are provided for receiving a locking pin (not shown) for locking the latch member either in a raised release position or in its FIG. 22 latching position.

Means indicated generally at 359 is provided for maintaining alignment of the latch pin 333 on each forward beam with the latch arm 335 on the frame 3 as the forward beam swings rearward and approaches the transport position, this alignment means comprising a follower 361 on the forward beam (15L or R) inward of its pivot 25 and means comprising a plate 363 on the frame for holding the follower down to prevent the beam from swinging down as the beam swings rearward and approaches its transport position. The arrangement is such that the follower 361 prevents the beam from swinging down to a point where the latch pin 333 on the pin would be too low to enter the notch 337 at the outer end of the latch arm 335 when the latch arm is in its lowered retracted position of FIG. 22. Each plate 363 is mounted on the bottom of the respective lateral extension 261 or 263 of the frame 3, and has an angled lip 365 engageable by the follower 361 as the beam swings toward transport position for guiding the follower under the plate if need be. As the beam swings out from transport to field position, follower 361 rides out from under the plate.

Means indicated generally at 347 in FIGS. 3 and 4 is provided for automatically locking the frame 3 in a raised transport position independently of the hydraulic and cylinder piston means in response to raising of the frame 3 to raised transport position. This eliminates dependence on the hydraulic system to maintain the frame raised in transport position for long-distance road travel. It comprises a latch arm 369 pin-connected at 371 at its forward end to one of the rocker rams 83 on the hub 71 of the wheel carrier 69 and extending rearward over a latching lug 373 on the frame cross-brace 67 rearward of the shaft 73. The arm comprises side bars 375 and a top bar 377, thereby being of inverted V-shape rearward of the pin connection 371. The side bars 375 straddle the lug 373, and the top bar 377 bears on the top of the lug, the arm 369 being biased by its own weight down on the lug. Holes 379 and 381 are provided in the side bars of the arm for reception of a latch pin 383. The lug 373 has a cam edge 385. The arrangement is such that with pin 383 in hole 381, as the frame 3 is moved up to transport positions, pin 383 rides up on the cam edge 385 and drops behind the lug mchanically to lock the carrier 69 from swinging up (counterclockwise as viewed in FIGS. 3 and 4) and this locks the frame 3 from moving down. Pin 383 is conveniently maintained in hole 379 when not needed for locking the frame in raised transport position for long-distance road travel.

The two cylinders 75 for raising and lowering the frame 3 and the four cylinders 273 for raising and lowering the beams 15L, R and 17L, R at the swivel wheels 31 are interconnected (e.g., series-interconnected) in a hydraulic circuit under control of a valve (not shown) on the towing vehicle (the tractor) and the cutting depth control valve V. The valve on the tractor, which may be referred to as the lift valve, is operable one way by the driver of the tractor to effect lifting of the frame and the beams, and another way to effect lowering of the frame and the beams. Lifting of the frame, and hence lifting of the pivots 25 for the beams (these pivots being on the frame), is effected by extending the piston rods 79 of cylinders 75 in effect to swing the wheel carrier 69 clockwise relative to the frame on the axis of shaft 73 as viwed in FIG. 4. With wheels 5 on the ground, this moves the shaft 73 and hence the frame 3 up. Assuming that the frame has initially been leveled by turning member 109 of the leveling means 87, the frame remains level as it is lifted. Lowering of the frame, and hence lowering of the pivots 25 for the beams, is effected by retracting the piston rods 79 in effect to swing the wheel carrier 69 counterclockwise on the axis of shaft 73 as viewed in FIG. 4. With wheels 5 on the ground, this brings the shaft 73 and hence the frame 3 down, the frame again remaining level. As the frame 3 moves up or down, the tongue 7 (being pivotally interconnected with the forward end of the frame at 9) swings up or down on a horizontal axis where it is coupled at 13 to the tractor, thus enabling the up and down movement of the frame with the frame remaining level while the frame is connected to the tractor by the tongue. As the beam pivots 25 move up or down, the posts 211 adjacent the outer ends of the beams are moved up or down, as the case may be, by the cylinders 273 (each post remaining generally vertical insmuch as it is the end link of a four-bar parallelogram linkage (217, 215, 213, 211)), thereby to move each beam up or down adjacent its outer end. This movement is equal to the frame movement so that the beam, having initially been made level, remains level on the up or down adjustment of the frame.

The up and down movement of the frame 3 and of the beams 15L, R and 17L, R at posts 211 is utilized to adjust the cutting depth of the gangs of discs 19 carried by the beams, and also to raise the beams and discs to the raised transport position wherein the discs 19 are wholly clear of the ground or road surface, as illustrated in FIG. 3. The raised transport position is generally the maximum height of the frame (i.e., the height attained on full extension of the piston rods 79). Discs 19 are lowered to the selected cutting depth by utilizing the cutting depth stop 85, the latter having been adjusted axially on the piston rod 79 to the point where, on retraction of the rod 79, it trips the valve V to cut off the operation of cylinders 75 and 273 when the piston rods 79 reach the retracted position corresponding to the height of the frame for the selected cutting depth.

FIG. 1 shows the tandem offset disc implement 1 in the field mode, i.e., the mode for tilling, with the forward beams 15 L, R extending out from the respective sides of the frame 3 at the forward gang angle A1 with respect to the longitudinal axis of the frame, and the rearward beams 17 L, R extending out from the respective sides of the frame at the rearward gang angle A3 with respect to the longitudinal axis of the frame, and with the forward and rearward beam on each side of the frame at the angle A2 with respect to one another. The forward beams are angled forward, and the rearward beams are angled rearward. The arms 43 of the linkages 41L and 41R are positively latched by latch means 59 in their field position (FIG. 1) each extending forward from its pivot 45 on the outside of the respective side of the tongue 7.

The first or forward links 47 extend rearward and angle outward from the sides of the tongue from their ball joint connections at 49 with the arms 43 at the forward ends of the arms to their ball joint connections at 51 with the members 157 on the forward beams 15L, R. As the implement 1 is pulled forward, the forward beams tend to swing rearward on pivot axes 27 of their pivots 25. This tends to pull the inner members 295 of links 47 out of the rearward ends of the outer members 293 of links 47 to the point where pins 301 in the inner members engage the rearward ends of the slots 297 in the outer members 293. This determines the extended length of links 47 in field position, and this length determines the gang angle A1 of the forward beams 15L, R. This gang angle is adapted to be changed by changing the extended length of links 47 by placing pins 301 in different holes 299 in the inner members 295 of the links. With pins 301 in the rearwardmost holes, the extended lengths of links 47 is a minimum, and the gang angle A1 of the forward beams a maximum. With pins 301 in other holes, the extended length of links 47 is greater, up to a maximum when the pins are in the holes next to bolts 305, and the gang angle A1 of the forward beams is lower. The holes may provide for forward beam gang angle settings (angle A1) of 18°, 20°, 22°, 24° and 26°, for example.

Still considering the implement 1 to be in the field mode (FIG. 1), the second or rearward links 53 extend rearward from their ball joint connections at 55 with members 157 on the forward beams 15L, R to their ball joint connections at 57 with members 155 on the rearward beams 17L, R. As the implement is pulled forward, the rearward beams tend to swing rearward on pivot axes 27 of their pivots 25. With the forward beams restricted from swinging rearward by extended links 47, the outer tube 307 of each link 53 is pulled rearward with respect to the forward inner member 309 of link 53 out of 309 to the point where the forward end of the forward slot 313 in the outer tube engages the pin 319 in the forward inner member 309, and the rearward inner member 311 of each link 53 is pulled rearward out of the rearward end of the outer tube to the point where pin 325 in the rearward inner member 311 engages the rearward end of the rearward slot 315 in the outer tube, thus determining the extended length of each link 53 in field position. This length determines the angle A2 between the forward and rearward beams and the gang angle A3 of the rearward beams. Angles A2 and A3 are adapted to be changed by changing the extended length of links 53 by placing pins 319 and 325 in different holes 317 and 323 in the forward and rearward inner members 309 and 311. With pin 319 in the forwardmost of holes 317 as shown in FIG. 19, the extension of the forward inner member 309 from the outer tube 307 is a minimum, and with pin 325 in the rearwardmost of holes 323, the extension of the rearward inner member 311 from the outer tube is a minimum, for a minimum length of link 53 and a minimum angle A2 and a maximum angle A3. The provision for adjustment of the extended length of each link 53 at its forward as well as at its rearward end enables adjustment of the gang angle A1 of the forward beams without changing the gang angle of the rearward beams. The change of angles is very readily effected as to each of link 47 and 53 simply by maneuvering the implement (if necessary) to have the hole 299 in which it is desired to drop pin 301 between the ends of slot 297, the hole 317 in which it is desired to drop pin 319 between the ends of slot 313, and the hole 323 in which it is desired to drop pin 325 between the ends of slot 315, then dropping in the pins, and then simply driving off in the tractor to pull the implement 1 forward, which results in the extension of the links to the limit as determined by engagement of the pins with the slot ends.

It will be observed that, as the implement 1 is towed through a field with the beams 15L, R and 17L, R out in field position, each beam is free to swing up and down on the axis 29 of its pivot 25 independently of the other beams. Thus, the implement has independent gang action; each beam may swing up independently of the other to enable its gang of discs to ride over an obstruction, without subjecting the implement to racking stresses. The two-way pivoting of the beams on axes 27 and 29 in the pivots 25 and the ball joint connectors at 49, 51, 55, 57, 149 and 153 permit this. As the forward beams 15L, R swing up or down, as permitted by their being pivoted on axes 29, they may swing forward, as permitted by their being pivoted on axes 27, and as permitted by the rearward beams 17L, R being free to swing forward, links 143L and R being free to extend.

The cylinders 127 for the arms 43 are interconnected (e.g., series-interconnected) in a separate hydraulic circuit from the circuit for cylinders 75 and 273 under control of a valve (not shown) on the tractor operable by the driver of the tractor to effect retraction of the piston rods 131 of cylinders 127 for swinging the arms 43 from field (FIG. 1) to transport (FIG. 2) position and vice versa. Assuming that the arms 43 are latched in their field position of FIG. 2, thereby holding the beams (via linkages 41L and R) in their field position, and the driver wishes to convert the implement to the transport mode for towing it over the road (or through a gate or over a bridge; etc.), while towing the implement forward he pulls on the cable 193 to release the latching means 59 for the arms 43 to enable these arms to swing out and back to the FIG. 2 transport position and, at the same time, actuates the valve for cylinders 127 to cause them to retract their piston rods 131 and swing the arms 43 out and back to their transport position. As the arms swing back, links 47 move back to their FIG. 2 transport position. The forward beams 15L, R swing back on the axes 27 of their pivots 25 to the FIG. 2 position. Links 47 are free to contract (i.e., to have their inner members 295 slide forward in their outer tubes 293) to an extent sufficient to enable the beams 15L, R to swing back to the FIG. 2 transport position wherein they extend generally parallel to the longitudinal vertical central plane on axis L of the implement. As the forward beams swing rearward, they contract the rearward links 53 to point where the spring 329 is compressed between the inner ends of members 309 and 311 of these links. That is, the forward inner members 309, of the rearward links 53 slide rearward into the outer tubes 307 of the links 53 to a point where they start driving the outer tubes 307 rearward, and the outer tubes 307 slide rearward on the rearward inner members 311 to a point where the spring 329 is compressed between the inner ends of members 309 and 311. Then the links 53 are driven rearward to swing the rearward beams 17L and R back to their transport position of FIG. 2 wherein they extend generally parallel to the longitudinal vertical central plane of the implement on axis L.

As the forward beams 15L, R swing back, the latch pins 333 on these beams enter the notches 337 at the outer ends of the latch arms 335 on opposite sides of the frame, lifting the latch members 339. The pins 333 engage the inner ends of these notches (as shown best in FIG. 22) to limit the rearward swing of the forward beams and determine their transport position. Latch members 339 drop in behind the pins to latch the forward beams in the transport position. Also, as the forward beams swing back to transport position, followers 361 on these beams come under plates 363 for assuring alignment of pins 333 with the notches 337.

As the rearward beams 17L, R swing back, the locking links 143L, R are contracted to the point where the collars 161 on the rearward sections 147 of these links engage the rearward ends of the forward sections 145 of these links, thereby determining the transport position of the rearward beams. The locking links are thereupon automatically locked in the contracted transport condition by the latch members 163 (which drop down in front of the transverse sections of the U-shaped lugs 167 (see FIGS. 6 and 7). This locks the rearward beams in transport position.

To convert from the transport to the field mode, latch members 163 of the locking links 143L, R for the rearward beams and latch members 339 of the locking means 331 for the forward beams are released and pinned in release position to allow extension of the locking links and travel of pins 333 out of the notches 337. Then the operator, while backing up the tractor to back up the implement, actuates the valve for cylinders 127 to cause them to extend their piston rods 131 and swing the arms forward to their field position. As the arms approach their field position, they engage and push in the latch plungers 175 and, when they reach the field position, springs 185 throw the latch bolt members to their latching position positively to lock the arms in their field position. As the arms swing forward, they pull links 47 forward to swing the forward beams 15L, R to field position. As the forward beams swing forward to field position, they pull the links 53 forward to swing the rearward beams 17L, R to field position.

The hydraulic actuation of the linkages 41L and R while pulling the implement 1 forward for conversion from the field mode to the transport mode and while backing up for conversion from the transport mode to the field mode is of significant advatage in that it enables the operator to convert from the field to the transport mode without having to stop the tractor, get off, and perform conversion operations off the tractor. Without such hydraulic action, under circumstnces where the swivel wheels 3 may roll freely over the ground, pulling the implement forward may not cause the beams to swing rearward. While the swivel wheels could be held against rolling freely by blocking them or providing them with brakes, this would require extra effort and delay for blocking or provision of a braking system with its additional cost.

The forward beams 15L and R, when in raised transport position, are held up by the arms 335 in this position even though the swivel wheels 31 for these beams may lose support. Such loss of support may occur, for example, when means 33 for the right forward swivel wheel extends out beyond the right side of a road over a ditch, or when the implement is towed over a culvert where the road is wider than the track of the rear swivel wheels but not as wide as the track of the forward swivel wheels. In an actual embodiment of the implement, in the transport mode, the track of the rear swivel wheels 31 is about fourteen feet and the track of the forward swivel wheels is about nine feet (this is only by way of example) so that the implement may travel over a road as narrow as about ten feet wide without problems on account of loss of support for the forward swivel wheels.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An agricultural implement comprising:

a frame on wheels, said frame having a longitudinal axis and left and right sides as viewed in a forward direction;

a tongue for hitching the frame to a towing vehicle, said tongue extending forward from the frame and being pivotally connected adjacent its rearward end to the frame for up and down swinging movement relative to the frame on an axis transverse to the frame;

means for raising and lowering the frame relative to its wheels;

a forward and a rearward tool-carrying beam on the left side of the frame;

a forward and a rearward tool-carrying beam on the right side of the frame;

each beam carrying a gang of tools;

each beam being pivoted on the frame on a first axis for swinging movement relative to the frame between a field position extending out from the respective side of the frame at an angle to the longitudinal axis of the frame and a transport position extending rearward from its pivot and generally parallel to the longitudinal axis of the frame;

each beam also being pivoted on the frame for up and down swinging movement relative to the frame on a second axis;

a swivel wheel for each beam;

means for raising and lowering each beam relative to its swivel wheel whereby the beam may be maintained in a generally horizontal position as the frame is raised or lowered relative to its wheels;

a linkage between the tongue and the left forward and rearward beams;

a linkage between the tongue and the right forward and rearward beams;

each linkage comprising an arm pivoted on the tongue for swinging movement between a field position extending forward from the pivot for the arm and a transport position extending out from the respective side of the tongue;

each of said arms being swingable up and down with the tongue on swinging of the tongue on said transverse axis and swingable in and out relative to the tongue between the said field and transport positions of the arm;

each linkage further comprising a first link having a connection at one end constituting its forward end to the respective arm and a connection at its other end constituting its rearward end to the respective forward beam, said connections being such as to allow up and down swinging of the tongue relative to the frame and the forward beam and to allow swinging movement of the forward beam between its field and transport positions and up and down swinging of the forward beam relative to the frame;

each linkage further comprising a second link having a connection at one end constituting its forward end to the respective forward beam and a connection at its other end constituting its rearward end to the respective rearward beam, said connections being such as to allow swinging movement of the beams between their field and transport positions and relative up and down swinging of each beam and the respective second link; and means for latching each of said arms in field position, said links thereupon holding said beams in field position as the implement is towed forward.

2. An agricultural implement as set forth in claim 1 wherein the connections of each of said first links at its forward and rearward ends with the respective arm and the respective forward beam are universal joints.

3. An agricultural implement as set forth in claim 1 wherein the connections of each of said second links at its ends with the respective forward and rearward beams are universal joints.

4. An agricultural implement as set forth in claim 1 wherein the connections of each of said first links at its forward and rearward ends with the respective arm and the respective forward beam and the connections of each of said second links at its ends with the respective forward and rearward beams are universal joints.

5. An agricultural implement as set forth in claim 4 having hydraulic-powered means for actuating said linkages comprising hydraulic cylinder and piston means interconnected between said tongue and said arms.

6. An agricultural implement as set forth in claim 1 having hydraulic-powered means for actuating said linkages.

7. An agricultural implement as set forth in claim 6 wherein said hydraulic-powered means comprises hydraulic cylinder and piston means interconnected between said tongue and said arms.

8. An agricultural implement as set forth in claim 7 wherein said hydraulic cylinder and piston means comprises a left-hand cylinder and piston means interconnected between the tongue and the left-hand arm, a right-hand cylinder and piston means interconnected between the tongue and the right-hand arm, said implement further having means interconnecting said arms for operation of said arms in unison.

9. An agricultural implement as set forth in claim 1 wherein the swivel wheel for each beam is rotatably mounted on a wheel carrier and the means for raising and lowering each beam comprises means supporting the beam on the respective wheel carrier, said supporting means being movable up and down for raising and lowering the beam.

10. An agricultural implement as set forth in claim 9 wherein each said supporting means extends laterally outwardly from the respective beam, and the respective wheel carrier is mounted at the outer end of the supporting means for swivelling about a generally vertical axis.

11. An agricultural implement as set forth in claim 10 wherein said first pivot axis of each of the beams is so inclined relative to the frame that the swivel wheels are generally vertical when the beams are swung to transport position and the implement is travelling in a level attitude.

12. An agricultural implement as set forth in claim 11 wherein said first pivot axis of each beam is in a vertical transverse plane of the frame inclined off vertical inwardly toward the longitudinal central plane of the frame from top to bottom.

13. An agricultural implement as set forth in claim 10 wherein each said supporting means comprises a linkage comprising a post extending up from the respective beam, upper and lower links extending out from the post, and a sleeve at the outer end of the links, said wheel carrier having a spindle extending upwardly therefrom rotatable in the sleeve.

14. An agricultural implement as set forth in claim 13 having hydraulic cylinder and piston means between the post and said linkage for swinging the linkage up and down.

15. An agricultural implement as set forth in claim 13 having means accessible at the upper end of the sleeve for adjusting the sleeve up and down relative to the spindle.

16. An agricultural implement as set forth in claim 15 wherein said spindle adjusting means comprises an adjusting screw rotatable on the axis of the sleeve in a head at the upper end of the sleeve, said spindle having a tubular member extending up from its upper end in the sleeve, said spindle being swivelled on the lower end of said tubular member, and said screw being threaded in a nut at the upper end of said tubular member.

17. An agricultural implement as set forth in claim 1 wherein the means for raising and lowering the frame relative to its wheels comprises hydraulic cylinder and piston means, and wherein the implement has means for automatically locking the frame in a raised transport position independently of said hydraulic cylinder and piston means in response to raising of the frame to its said raised transport position.

18. An agricultural implement as set forth in claim 1 wherein said means for raising and lowering the frame comprises a wheel carrier carrying the wheels movable to raise and lower the frame relative to the wheels, and wherein means is provided interconnecting the wheel carrier and the tongue for enabling raising and lowering of the frame relative to the wheels, with the tongue connected to a towing vehicle, in such manner as to maintain the frame in a predetermined attitude relative to the ground.

19. An agricultural implement as set forth in claim 1 wherein the frame is mounted on a single set of wheels rotatable on a horizontal axis extending transversely with respect to the frame at the lower end of a wheel carrier pivoted at its upper end for swinging movement on a horizontal axis extending transversely of the frame, and having means interconnected between the wheel carrier and the tongue enabling raising and lowering of the frame relative to the wheels, with the tongue connected to a towing vehicle, with the frame remaining in a predetermined attitude relative to the ground.

20. An agricultural implement as set forth in claim 19 having adjustable means in said interconnecting means for adjusting the attitude of said frame.

* * * * *